United States Patent
Uchiyama et al.

[19]

[11] Patent Number: 6,042,927
[45] Date of Patent: *Mar. 28, 2000

[54] MAGNETIC DISK

[75] Inventors: Hiroshi Uchiyama; Susumu Haga, both of Miyagi, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/805,132

[22] Filed: Feb. 24, 1997

[30] Foreign Application Priority Data

Feb. 29, 1996 [JP] Japan .............................. P08-043811

[51] Int. Cl.[7] ..................................................... G11B 5/82
[52] U.S. Cl. ......................... 428/141; 428/65.3; 428/65.7; 428/336; 428/457; 428/694 SG; 428/900; 360/135
[58] Field of Search .................................. 428/141, 65.3, 428/65.7, 336, 457, 694 SG, 900; 360/135

[56] References Cited

U.S. PATENT DOCUMENTS

| | | | |
|---|---|---|---|
| 4,363,844 | 12/1982 | Lewis et al. | 428/65 |
| 5,388,020 | 2/1995 | Nakamura et al. | 360/135 |
| 5,607,740 | 3/1997 | Noda | 428/65.3 |
| 5,750,230 | 5/1998 | Ishikawa et al. | 428/65.3 |

*Primary Examiner*—Stevan A. Resan
*Attorney, Agent, or Firm*—Hill & Simpson

[57] ABSTRACT

A magnetic disk yields an excellent off-track characteristics and a high coercive force if a track density is increased. The magnetic disk includes a non-magnetic plate on which data such as a servo signal is formed by convexo-concave patterns and an metallic magnetic film formed on the non-magnetic plate. The metallic magnetic film has a thickness of 50 nm or lower. Between the non-magnetic plate and the metallic magnetic film is formed a primary coat composed of a first and a second coats. The first coat is made of any one of C, Si and Ge and the second coat is made of Cr as a main component. The first coat has a thickness of 2 to 80 nm. The second coat has a thickness of 5 to 108 nm.

12 Claims, 6 Drawing Sheets

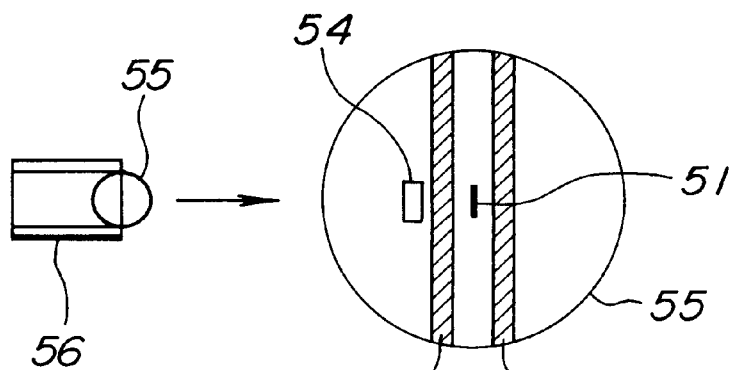
FIG. 7A  FIG. 7B
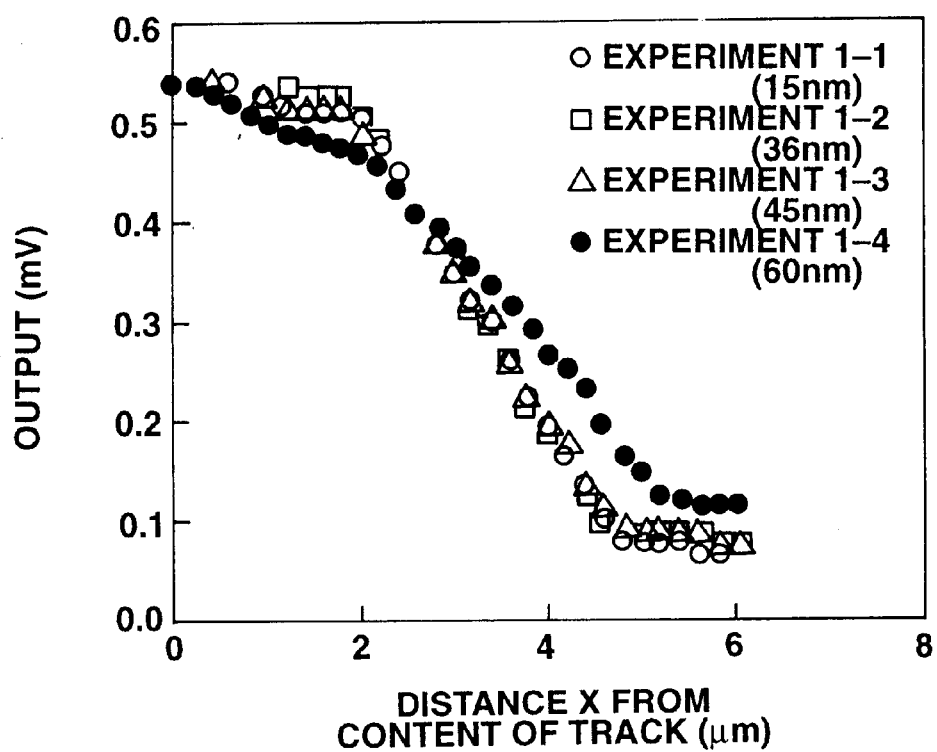
FIG. 8

MAGNETIC DISK

BACKGROUND OF THE INVENTION

1. Field of the Invention

The present invention relates to a magnetic disk, and more particularly to a PERM (Pre-embossed Rigid Magnetic) disk from which data is reproduced with a magneto-resistance effect type head.

2. Description of the Related Art

As a magnetic recording medium often used for a computer, disc-like magnetic disks have been widely used on which data may be accessed at random. Of those magnetic disks, from a view of responsiveness, a sort of magnetic disk (so-called hard disk) has been selectively used which uses as its circular plates a hard material, such as a glass plate, a plastic plate, or an Al-alloy plate on which Ni—P is planted or alumite is treated.

This sort of magnetic disk has been requested to keep its recording density higher and higher. With the enhancement of the recording density, it has been requested that the media design and the recording and reproducing system are arranged to suit to a precode and encode system that can precisely convert an analog signal into the corresponding digital signal.

For recording data on this sort of magnetic disk, one or more magnetic disks for recording the data on each disk surface are combined with a ring head. The ring head utilizes an electromagnetic induction phenomenon. This ring head is mounted on a slider so that the head is run in the floating state from the magnetic disk surface. The distance between the head and the disk surface is minute and is kept by an air flow caused by the rotation of the disk.

This ring head, however, produces a far lower reproducing output as the track width is made narrower, which is an obstacle to securing a sufficient S/N ratio. It means that the increase of the density in the track width direction is restricted.

In order to overcome the disadvantageous restriction, a compound magnetic head composed of the ring head and the magneto-resistance effect head (simply called MR head) is now being used, where the ring head is responsible for recording data and the MR head is responsible for reproducing data. The MR head used in the compound magnetic head produces an output defined by the quantitive change of a magnetic flux at each circumferential unit length. Basically, as the track width is made narrower, the MR head keeps the output. Hence, the MR head is effective for a magnetic disk with a higher track density.

The foregoing description has been oriented to how the magnetic head overcomes the shortcoming entailed by a higher recording density. On the other hand, the magnetic disk has been devised for increasing the track density in various ways.

For example, for narrowing the track width, if the track width is made too narrow, a track suffers from crosstalk caused by a magnetic signal recorded on an adjacent track, which results in degrading the S/N ratio.

In order to suppress the crosstalk, there has been proposed a technique of forming on the plate surface convexo-concave patterns matching to the data tracks.

The convexo-concave patterns formed on the plate surface are directly reflected on the surface of a magnetic layer, so that the same convexo-concave patterns appear on the surface of the magnetic layer. For example, when a convex portion is matched to the data track, a concave portion is laid between these data tracks. This arrangement prompts the magnetic separation. Hence, if the track width is made relatively narrow, one data track may be protected from the adverse effect of the magnetic signal recorded on the adjacent data track. The arrangement, hence, offers an excellent off-track characteristic.

Further, as an application of this magnetic disk, a PERM disk has been developed (see MR 93-34, November, 1993 of Electronics and Communications Society). This PERM disk contains the data tracks and a servo signal formed as the convexo-concave patterns on the plate.

This PERM disk uses a plate molded from plastic, on which data such as the servo signal is pre-formatted. Hence, this PERM disk eliminates a troublesome work of writing the servo signal on a magnetic layer. This is advantageous in lowering the cost of the disk.

As described above, this sort of magnetic disk has been devised to cope with a higher recording density through the effect of the MR head or the PERM disk.

However, in order to enhance the recording density of the magnetic disk, it is necessary to develop the magnetic disk further.

That is, as mentioned above, the PERM disk has been arranged to allow the concave portion formed between the adjacent tracks to prompt the magnetic separation therebetween. But the hitherto known PERM disk cannot provide sufficient magnetic separation, so that as the distance between the adjacent tracks is made narrower, the crosstalk is still likely to appear. It means that the off-track characteristic may be improved further.

Moreover, the PERM disk or the MR head cannot provide a sufficient magnetic characteristic.

In reproducing a signal through the MR head, on the magnetic layer, it is desirous to keep a flux reversal transition width narrow, that is, keep a ratio of a product $Mr \cdot \delta$ to a coercive force Hc small, wherein Mr denotes a residual field and $\delta$ denotes a thickness of a magnetic layer. For example, about the coercive force Hc, for realizing a higher recording density than 1 Gbits/inch$^2$, a higher coercive force than 2000 Oe (about 159 kA/m) is required.

Since the MR head dedicated to reproduction is used, priority is placed only on the recording characteristic when the ring head is designed. This design makes it possible to enhance the recording performance of the ring head and it is necessary to increase the coercive force of the recording medium.

About the coercive force, it has been reported that the metallic magnetic film enhances its coercive force if the plate is heated higher than 200° C. when forming the metallic magnetic film. This technique, however, is improper to the PERM disk made of a plastic plate, because the plastic is thermally deformed.

SUMMARY OF THE INVENTION

The present invention is proposed in consideration of the foregoing circumstances, and it is an object of the present invention to provide, if a track density is increased, a magnetic disk which is arranged to present an excellent off-track characteristic, a higher coercive force, and a high resolution in sensing a signal.

In carrying out the object, according to an aspect of the present invention, a magnetic disk includes a metallic magnetic film formed on a non-magnetic plate containing at least a servo signal formed as convexo-concave patterns, wherein the metallic magnetic film has a thickness of 50 nm or lower.

According to another aspect of the present invention, a magnetic disk includes a primary coat and a metallic magnetic film formed on a non-magnetic plate containing at least a servo signal formed by convexo-concave patterns, wherein the primary coat has a thickness of 110 nm or smaller.

These kinds of magnetic disks in which the thickness of the metallic magnetic film or a primary coat formed under the film is restricted to a relatively thin range may offer an excellent off-track characteristic or overwrite characteristic.

In a case that the metallic magnetic film is composed of Co—Pt system alloy, assuming the PT content is 16 atomic % or larger and its thickness ranges from 8 to 50 nm, those magnetic disks may have a larger coercive force than 150 kA/m, which makes it possible to sense a signal at high resolution.

Further, the primary coat located under the metallic magnetic film results in improving the coercive force of the metallic magnetic film further, thereby enhancing the resolution of the MR head. This makes great contribution to keeping the recording density of the magnetic head higher.

Other objects and advantages of the present invention will become apparent from the detailed description to follow taken in conjunction with the appended claims.

BRIEF DESCRIPTION OF THE DRAWINGS

FIG. 7A is a model view showing a compound magnetic head in which an inductive head is responsible for recording and an MR head is responsible for reproduction;

FIG. 7B is an expanded view showing the compound magnetic head as viewed from a sliding surface of the magnetic head;

FIG. 8 is a characteristic view showing an off-track characteristic of various kinds of magnetic disks having the corresponding metallic magnetic films;

DESCRIPTION OF THE PREFERRED EMBODIMENTS

Hereafter, the description will be oriented to a magnetic disk according to an embodiment of the present invention.

Figure 1:
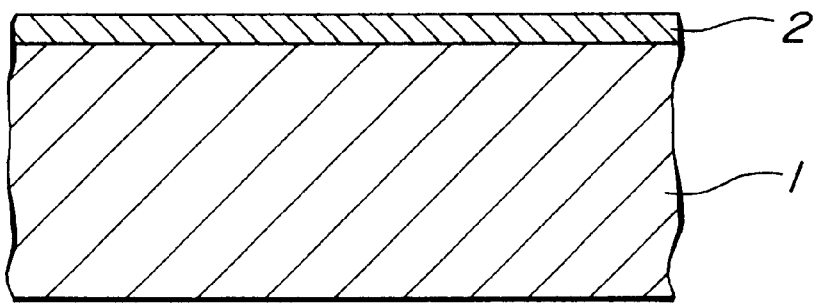
FIG. 1 is a schematic sectional view showing an essential part of a magnetic disk according to an embodiment of the present invention.

At first, FIG. 1 shows the magnetic disk according to a first embodiment of the present invention. As shown, this magnetic disk includes a circular non-magnetic plate 1 and a metallic magnetic film 2 formed thereon.

On one main surface of the non-magnetic plate 1 are formed convexo-concave patterns that correspond to the recording tracks and a servo signal.

This plate is made of glass, plastic, aluminium, or aluminium alloy. Of these materials, the plastic is beneficial in mass production, because it may be shaped into a plate by the injection molding. It is desirous that the plate has a surface coarseness Ra of 2 nm or smaller and Rmax of 25 nm or smaller. For keeping the recording density higher, it is necessary to lower the floating distance of the head to 50 nm or lower. For stably realizing the floating distance of the head, it is necessary to keep the Rmax and Ra in this range, wherein the surface coarseness Ra denotes an average coarseness Ra of a central line regulated by JIS B060 and the surface coarseness Rmax denotes a maximum height Rmax regulated by JIS B0601.

The metallic magnetic film 2 is a recording layer on which a data signal is recorded by in-plane flux reversal. The film is composed of a Co-system metallic magnetic material, for example. As this Co-system metallic magnetic material, it is possible to use a material of Co only, Co—Pt system alloy, or Co—Pd system alloy.

Preferably, the Co—Pt system alloy has a Pt content of 16 atomic % or larger from a view of a coercive force. If a spacing between the magnetic head and the metallic magnetic film is 90 nm or lower, it is necessary to keep the coercive force 150 kA/m or higher for sensing a signal at high resolution. To keep the coercive force 150 kA/m or higher, it is necessary to keep the Pt content of the Co—Pt system alloy 16 atomic % or lower. Far more of Pt content does not bring about magnetism. Hence, since the Pt content is disallowed to exceed 95 atomic %, the Pt content is practically 80 atomic % or lower.

Further, the metallic magnetic film 2 may be composed of a ternary alloy that contains Cr in the foregoing alloy, such as a Co—Pt—Cr system alloy or a Co—Pd—Cr system alloy. However, it is preferable that the content of Cr is 40 atomic % or lower. In particular, it is preferable that the Co—Pt—Cr system alloy has Pt of 16 to 23 atomic, Cr of 20 or lower atomic %, and Co of the remaining atomic %. In addition, the elements to be contained in the alloy may be Cr, Ta, W or Si. The upper limit of the content of such an element is 50 atomic %.

On this kind of metallic film 2 is formed by the so-called PVD technique, such as a vacuum evaporating method in which a ferromagnetic metallic material is heated and evaporated in vacuum and deposited on a non-magnetic supporting plate, an ion-plating method in which a ferromagnetic metallic material is evaporated in discharge, or a sputtering method in which argon ions caused by glow discharge in the atmosphere containing argon as a main component hit the atoms out of the target surface.

The thickness of the metallic magnetic film 2 is restricted to be 50 nm or lower, which results in improving the off-track characteristic and the overwrite characteristic.

Figure 2:
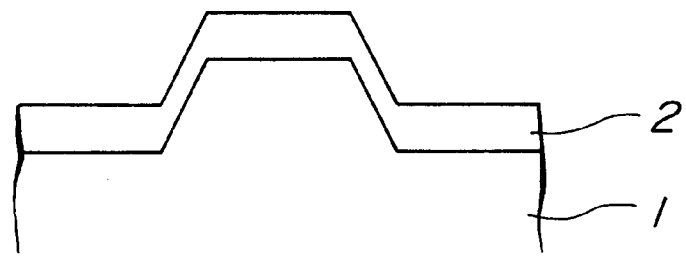
FIG. 2 is a model view showing ideal convexo-concave patterns formed on a metallic magnetic film coated on the magnetic disk.

In a case that the metallic magnetic film 2 is formed on the plate having convexo-concave patterns formed thereon by means of the sputtering method, for example, sputter particles are ideally rushed only from the top of the convexo-concave patterns. In this case, as shown in FIG. 2, the metallic magnetic film 2 precisely reflects the shape of the plate 1, so that the convexo-concave patterns are sharply formed on the metallic magnetic film.

Figure 3:
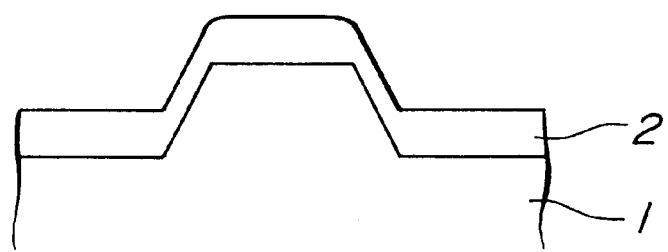
FIG. 3 is a model view showing convexo-concave patterns formed on a metallic magnetic film coated by a sputtering method.

In actual sputtering technique, however, the sputter particles are incident on the plate in various directions. As shown in FIG. 3, therefore, the convexo-concave patterns are dully shaped on the metallic magnetic film 2 in a manner to keep these edges curved. In this case, when the head is floated from the magnetic disk, the head is separated from the metallic magnetic film 2 near the track edge. The increase of the spacing results in degrading the signal quality, thereby damaging the off-track characteristic and the overwrite characteristic.

The convexo-concave edges shaped on the metallic magnetic film 2 are made duller as the metallic magnetic film 2 is thicker. To overcome this shortcoming, the magnetic disk according to the present invention is arranged to restrict the thickness of the metallic magnetic film 2 to 50 nm or lower. If the metallic magnetic film is made so thinner, the convexo-concave patterns are shaped on the metallic magnetic film as keeping the relatively acute edges, thereby improving the off-track characteristic and the overwrite characteristic.

In particular, in a case that a Co—Pt system alloy is used for coating the metallic magnetic film 2 and the Pt content is 16 atomic % or larger, for enhancing the coercive force, it is better to restrict the thickness of the metallic magnetic film in the range of 8 to 50 nm, preferably, 15 to 35 nm.

As set forth above, in a case that a spacing between the magnetic head and the metallic magnetic film is 90 nm or lower, for sensing a signal at high resolution, the magnetic disk is required to keep the coercive force 150 kA/m or higher. On the other hand, the coercive force is changed on the thickness of the metallic magnetic film. To secure the coercive force of 150 kAm or higher, it is necessary to restrict the thickness of the metallic magnetic film in the range of 8 to 50 nm. In a case that a spacing between the magnetic head and the metallic magnetic film is 70 nm or lower, it is necessary to restrict the coercive force to be 167 kA/m or higher. The coercive force of 167 kA/m or higher results in keeping the thickness of the metallic magnetic film in the range of 15 to 35 nm. The foregoing thickness range is determined from those points of view.

Figure 4:
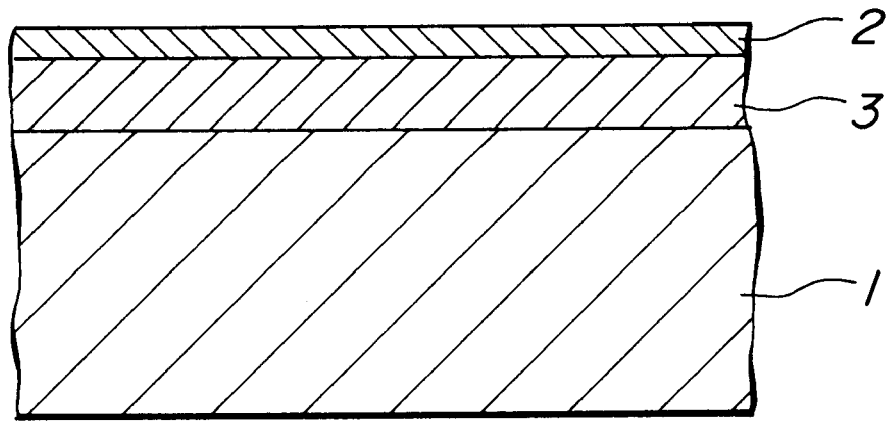
FIG. 4 is a schematic sectional view showing an essential part of a magnetic disk according to another embodiment of the present invention.

In turn, the description will be oriented to a magnetic disk according to a second embodiment of the present invention with reference to FIG. 4.

The magnetic disk provides a primary coat 3 for increasing a coercive force of the metallic magnetic film between the circular non-magnetic plate 1 and the metallic magnetic film 2. On the main surface of the non-magnetic plate 1 are formed convexo-concave patterns that match to the recording tracks and the servo signal.

This plate may be composed of any material as illustrated about the magnetic disk according to the first embodiment of the invention.

This magnetic disk is not required to heat the plate when forming the metallic magnetic film for controlling the coercive force, because the primary coat 3 serves to enhance the coercive force of the metallic magnetic film. Hence, a plastic material whose glass transition temperature is 120° C. or lower may be used for composing the disk.

The primary coat 3 serves to increase the coercive force of the metallic magnetic film 2 by enhancing the in-plane orientation of the metallic magnetic film 2 coated on the primary coat 3. The magnetic disk of this embodiment is arranged so that the primary coat 3 is restricted to have a thickness of 110 nm or lower. This restricted thickness results in improving the off-track characteristic and the overwrite characteristic.

In a case that the primary coat 3 is coated on the plate having the convexo-concave patterns formed thereon by the sputtering method, for example, the sputter particles are rushed on the plate 1 in various directions. As the primary coat 3 is made thicker, therefore, the convexo-concave patterns on the primary coat 3 have duller edge shapes than those patterns on the plate 1. The metallic film 2 coated on the primary coat 3 also has duller edge-shaped convexo-concave patterns.

If the thickness of the primary coat 3 is suppressed to be 110 nm or lower, the relatively acute convexo-concave patterns are formed on the primary coat, which are reflected on the metallic magnetic film 2 so that the film 2 has acute edge-shaped convexo-concave patterns. This makes it possible for the magnetic disk to improve the off-track characteristic and the overwrite characteristic.

The material used for making the primary coat 3 serves to improve the in-plane orientation of the metallic magnetic film. For example, the primary coat containing Cr as a main component may be referred. However, the primary coat of Cr is required to have a thickness of 150 nm or higher so that only the primary coat serves to improve the in-plane orientation of the metallic magnetic film 2.

Figure 5:
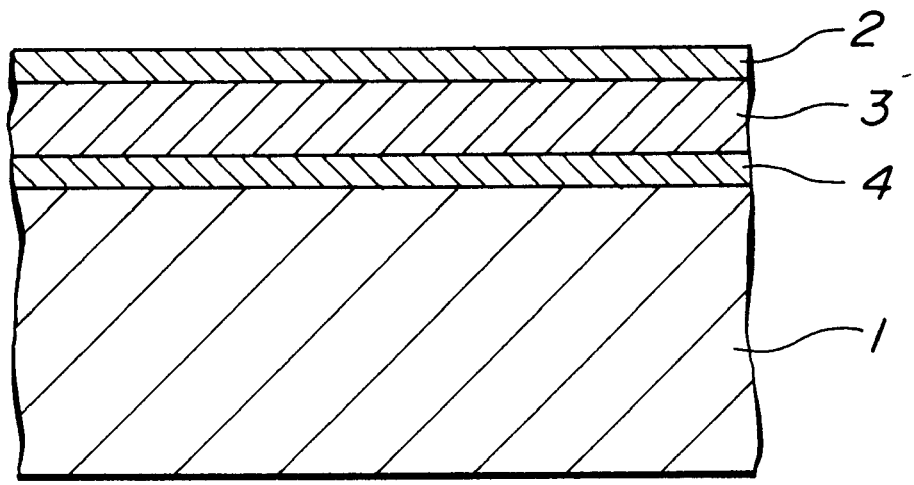
FIG. 5 is a schematic sectional view showing an essential part of a magnetic disk according to another embodiment of the present invention.

In the case of using the primary coat 3 of Cr, therefore, as shown in FIG. 5, it is preferable to use the primary coat of Cr as the second primary coat 3 and locate a first primary coat 4 composed of at least any one of C, Si and Ge between the second primary coat 3 and the non-magnetic plate 1.

The dual-layered primary coat 5 as described above allows the crystallinity of the second primary coat 3 containing Cr as a main component to improve the in-plane orientation of the metallic magnetic film 2, thereby increasing the coercive force of the metallic magnetic film 2. The first primary coat 4 composed of at least any one of C, Si, and Ge has an amorphous surface which has a fine effect on the crystallinity of the second primary coat 3. Hence, the second primary coat 3 is effective in the relatively thin film thickness, which leads to increasing the coercive force though the overall thickness of the primary coats 3 and 4 are suppressed to be thinner.

The first primary coat 4 may be composed of a sole element of C, Si and Ge or a combination of two or more of them. Preferably, the thickness of the first primary coat 4 is 2 to 80 nm. If the thickness of the first primary coat 4 is less than 2 nm, the first primary coat 4 is not so effective that it does not serve to sufficiently improve the crystallinity of the second primary coat 3. Moreover, if the thickness of the first primary coat 4 is longer than 80 nm, the first primary coat 4 may be stripped.

The second primary coat 3 may be solely composed of a sole element Cr or a main element Cr and another metallic element of Ti, for example. If the addition of Ti to Cr ranges from 0 to 20 atomic %, the second primary coat 3 enhances the effect of increasing the coercive force of the metallic magnetic film 4. Preferably, the thickness of the second primary coat 3 should range from 5 to 108 nm. If the thickness of the second primary coat 3 is less than 5 nm, the second primary coat 3 does not serve to sufficiently enhance the coercive force of the metallic magnetic film 2. Further, if the total thickness of the first primary coat 4 and the second primary coat 3 is thicker than 110 nm, those coats are made to have dull convexo-concave edges on the metallic magnetic film 2, which results in degrading the off-track characteristic and the overwrite characteristic.

The metallic magnetic film 2 is formed on the primary coat. The film 2 may be composed of any one of the alloy films illustrated with respect to the first embodiment. It is preferable to suppress the thickness of the metallic magnetic film 2 as 50 nm or less. The 50 nm or less thickness of the metallic magnetic film 2 makes the convexo-concave edges duller, thereby improving the off-track characteristic and the overwrite characteristic.

The foregoing composition is a basic one of the magnetic recording medium. This magnetic recording medium may have such an additional composition as normally given to this kind of magnetic recording medium. For example, a hard protective film made of carbon or the like may be formed on the metallic magnetic film or a lubricant agent may be coated on the film, for providing the film with durability.

In turn, the description will be oriented to the embodiments of the present invention on the experimental results.

The following experiments 1-1 to 1-14 were executed to study the thickness of the metallic magnetic film. The following experiments 1-15 to 1-17 were executed to study a Pt content of the metallic magnetic film. The following experiments 2-1 to 2-5 were executed to study the thickness of a monolayered primary coat. The following experiments 3-1 to 3-38 were executed to study the thickness of a dual-layered primary coat.

EXPERIMENT 1-1

The magnetic disk produced in this experiment is constructed to include a primary coat, a metallic magnetic film and a protective film on a plastic plate on which convexo-concave patterns are formed.

In order to produce this magnetic disk, the plastic plate (polyolefine) was produced as follows.

At first, a glass plate is prepared. Then, photoresist is coated on the glass plate. This photoresist is exposed by the groove patterns obtained on the cutting data and developed and cut for forming a resist pattern. Next, an Ni-plating film is deposited on the resist pattern and then is stripped off the resist pattern. The rear surface of the Ni-plating film is abraded to a desired thickness. This plating film is used as a stamper for molding the plate from plastic.

The resulting plastic plate has a diameter of 2.5 inches and contain concentrically formed grooves, each depth of which is 200 nm. The convex portion is a recording track, the width of which is 3.2 $\mu$m and the pitch of which is 4.8 $\mu$m.

The surface coarseness of the plastic plate is adjusted so that the average surface coarseness Rs is 2 nm or less and the maximum projection height Rmax is 25 nm or less. Then, on the plate are formed a Cr primary coat, a metallic magnetic film of $Co_{80}Pt_{20}$, and a carbon protective film.

Figure 6:
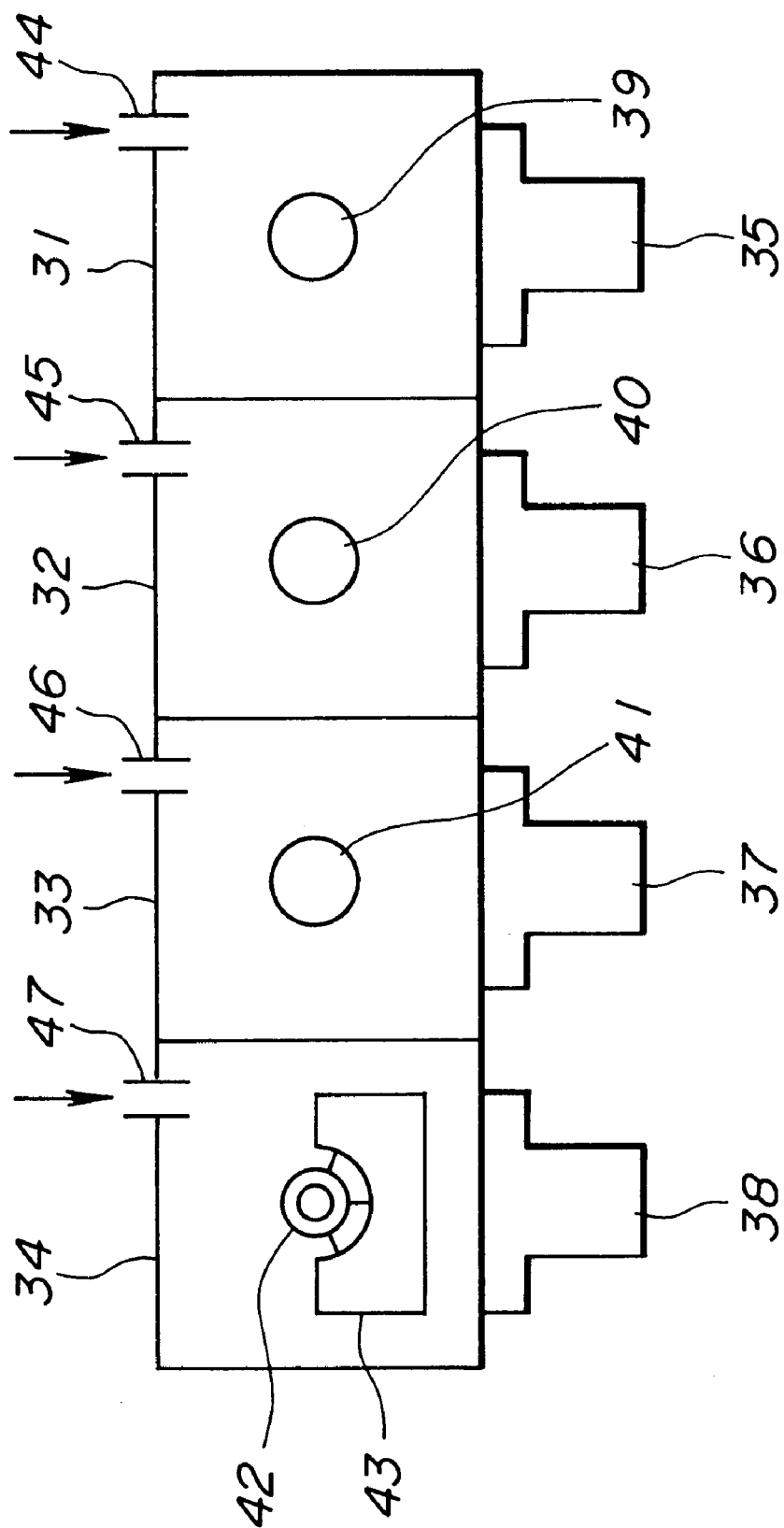
FIG. 6 is a model view showing an in-line type sputtering apparatus for forming a primary coat, a metallic magnetic film, and a protective layer.

FIG. 6 shows an in-line type sputtering apparatus for forming the primary coat, the metallic magnetic film and the protective film.

In this sputtering apparatus, plates 42 are mounted on pallets 43 so that the primary coat, the metallic magnetic film and the protective film are sequentially formed on the plates 42 on the line. The sputtering apparatus includes a first sputtering chamber 31 for forming the primary coat, a second sputtering chamber 32 for forming the metallic magnetic film, a third sputtering chamber 33 for forming the protective film, and a plate removing chamber 34 for removing the plate having those films formed thereon from the pallet 43 in the describing sequence. Those chambers are independent of one another. Each chamber keeps in vacuum by exhaust systems 35, 36, 37 and 38. The adjacent chambers may be shut or communicated with each other by a valve. The pallet 43 on which the plate 42 is mounted is conveyed in and out of each chamber through the valve.

Of those chambers in vacuum condition, the first sputtering chamber 31, the second sputtering chamber 32, and the third sputtering chamber 33 have targets 39, 40 and 41 served as cathodes on the centers of the vacuum chambers. The pallet 43 on which the plate 42 is mounted is located as opposed to each target. Those targets 39, 40 and 41 are selected in a manner to correspond to the sputtering films formed in those chambers. The first sputtering chamber 31 has a primary coat target such as a Cr target. The second sputtering chamber 32 has a metallic magnetic film target such as a $Co_{80}Pt_{20}$ target. The third sputtering chamber 33 has a carbon target. Those sputtering chambers provide gas pipes 44, 45, 46 and 47.

In those sputtering chambers, a minus potential of about 600 to 800 is applied to the targets, so that the minus potential causes discharge between the target and the pallet. The discharge atmosphere causes the inlet Ar gas to be ionized and rush against the target surface at high speed. Then, target particles are hit out of the target surface and then coated and deposited. The deposit of the target particles are made to be a sputter film.

On the other hand, the plate removing chamber 34 located adjacently to the third sputtering chamber 33 is an outlet chamber for taking the plate from a decompressed pressure to an atmospheric pressure. This chamber has a decompressed pressure when conveying the pallet 43 to which the plate 42 is mounted in to the chamber. After the pallet 42 is conveyed in the chamber, the valve is closed between the open sputtering chamber 33 and the plate removing chamber 34 for introducing the air. When the pressure of the plate removing chamber 34 is made equivalent to the atmospheric pressure, the plate 42 is taken out of the chamber 34.

In any of the sputtering chambers, the chamber pressure before sputtering is 2E—6 Pa or less. The distance between the plate and the target is 60 mm and the target has a diameter of 152.4 mm. During the sputtering operation, the pallet is kept in room temperature.

The Cr primary coat, the metallic magnetic film of Co—Pt, and the carbon protective film are formed under the following sputtering conditions.

Cr primary coat
  Thickness: 100 nm
  Film Forming Speed: 2 nm/sec
  Argon Pressure: 0.1 Pa
 $Co_{80}Pt_{20}$ Metallic Magnetic Film
  Thickness: 15 nm
  Film Forming Speed: 2 nm/sec
  Argon Pressure: 0.13 Pa
 Carbon Protective Layer
  Thickness: 10 nm
  Film Forming Speed: 0.5 nm/sec
  Argon Pressure: 0.5 Pa After forming the primary coat, the metallic magnetic film, and the protective layer in the foregoing manner, a fluorine lubricant agent is coated on the protective layer for producing the magnetic disk.

EXPERIMENT 1-2

The magnetic film is produced in the same way as the experiment 1-1 except that a $Co_{64}Pt_{20}Cr_{16}$ alloy film is formed as the metallic magnetic film to have a thickness of 36 nm.

EXPERIMENT 1-3

The magnetic film is produced in the same way as the experiment 1-1 except that a $Co_{60}Pt_{20}Cr_{20}$ alloy film is formed as the metallic magnetic film to have a thickness of 45 nm.

EXPERIMENT 1-4

The magnetic film is produced in the same way as the experiment 1-1 except that a $Co_{58}Pt_{20}Cr_{22}$ alloy film is formed as the metallic magnetic film to have a thickness of 60 nm.

In the magnetic disk produced as described above, a saturated magnetization thickness Mr·δ (Mr: residual magnetization, δ: thickness of metallic magnetic film), a coercive force Hc, and a coercive force square ratio S* were measured by a vibrating specimen magnetometer (VSM). The measured results were Mr·δ=12.5 mA, Hc=150 kA/m, and S*=0.82.

Then, as for the foregoing magnetic disks, the data was recorded and reproduced for checking the overwrite characteristic and the off-track characteristic.

In this experimental recording and reproduction, as shown in FIGS. 7A and 7B, a compound magnetic head was used which includes an MR head (reproducing head) having an MR element 51 vertically laid between sealing films 52 and 53, and an inductive head (recording head) 54 laminated on the MR head. The compound magnetic head is mounted on a slider 56 so that the disk enters into the floating state when recording and reproducing data. The compound magnetic head has a recording track width of 3.5 μm and a reproducing track width of 2.5 μm.

For estimating the overwrite characteristic, the experiment was executed to record a frequency signal of 1 MHz on both of the convexes and the concaves at a linear speed of 7 m/sec, a frequency signal of 7 MHz on the convexes, and then measure the frequency signal of 7 MHz reproduced from the convexes. The practical value of the overwrite characteristic is 25 dB or higher.

For estimating the off-track characteristic, the experiment was also executed to record a frequency signal of 1 MHz and then a frequency signal of 7 MHz on the frequency signal, actuate the magnetic head to scan across the recording tracks, and then measure the output profile produced by the scan.

The measured result of the overwrite characteristic is listed in Table 1. The measured result of the off-track characteristic is shown in FIG. 8.

TABLE 1

| | Thickness of Metallic Magnetic Film (nm) | Composition of Metallic Magnetic Film | Overwrite Characteristics (dB) |
|---|---|---|---|
| Experiment 1-1 | 15 | $Co_{80}Pt_{20}$ | 35.2 |
| Experiment 1-2 | 36 | $Co_{64}Pt_{20}Cr_{16}$ | 31.3 |
| Experiment 1-3 | 45 | $Co_{60}Pt_{20}Cr_{20}$ | 28.7 |
| Experiment 1-4 | 60 | $Co_{58}Pt_{20}Cr_{22}$ | 23.5 |

As listed in Table 1, the magnetic disk produced by the experiments 1-1 to 1-3, the metallic magnetic film of which has a thickness of 50 nm or less, produces an output of 25 dB or more. This magnetic disk can provide a practical overwrite characteristics. On the other hand, the magnetic disk produced by the experiment 1-4, the metallic magnetic film of which has a thickness of 60 nm, produces an output of less than 25 dB. Hence, this magnetic disk cannot provide a necessary overwrite characteristics.

As is obvious from FIG. 8, when the magnetic head is slipped off the track (off track), the magnetic disk produced by this experiment 1-4 brings about a great residual signal. This indicates that the effusion of the signal is too much.

From the above description, as for the PERM disk, for improving the overwrite characteristics and the off-track characteristics, it was understood that the thickness of the metallic magnetic film is required to be 50 nm or less.

EXPERIMENTS 1-5 TO 1-14

Those experiments are the same as the experiment 1-1 except that a $Co_{64}Pt_{20}Cr_{16}$ alloy film is formed as the metallic magnetic film to have a thickness of 5 to 60 nm.

As for the magnetic disk produced by those experiments, the coercive force Hc was measured by a Kerr effect measuring apparatus. The relation between the thickness of the metallic magnetic film and the coercive force Hc is shown in FIG. 9.

Figure 9:
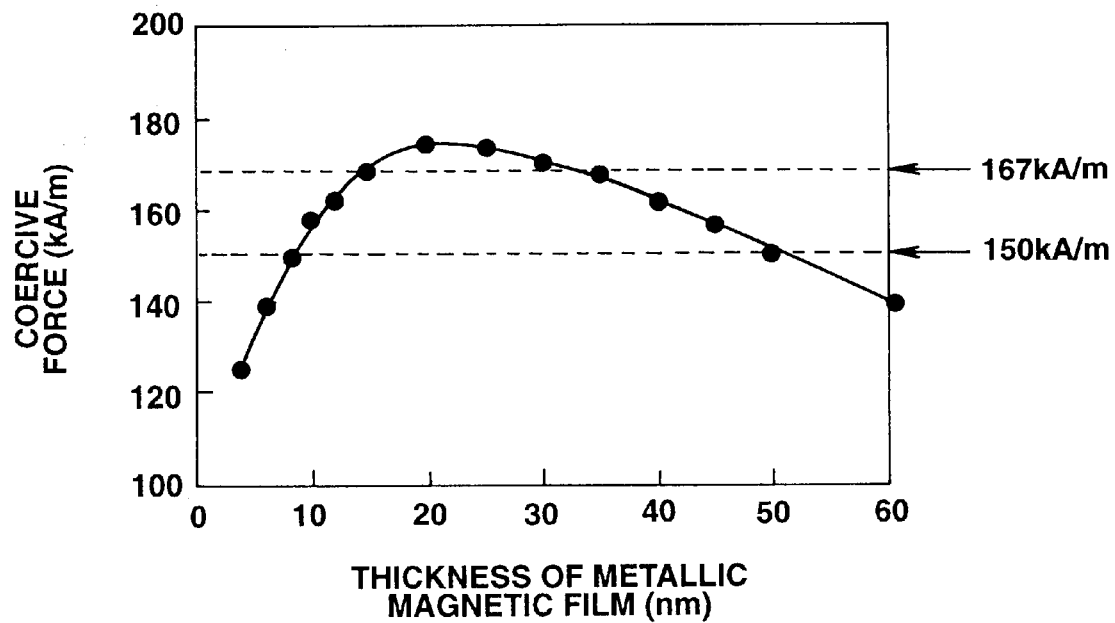
FIG. 9 is a characteristic view showing a relation between a thickness of the metallic magnetic film and a coercive force Hc.

As is obvious from FIG. 9, the coercive force Hc of the magnetic disk is changed depending on the thickness of the metallic magnetic film. That is, in the range that the thickness of the metallic magnetic film is thinner than 20 nm, the coercive force Hc is made larger according to the increase of the thickness. In the range that the thickness of the metallic magnetic film is thicker than 20 nm, the coercive force Hc is made smaller according to the increase of the thickness. The thickness of about 20 nm leads to securing a maximum coercive force Hc.

The recording density of the magnetic disk in the linear direction is determined on a half band width PW50 of an isolated reproduction waveform of the reproduction signal. In order to enhance the recording density in the linear direction from the current state, it is necessary to keep the half band width PW50 0.4 μm or less.

The spacing between the metallic magnetic film and the magnetic head calculated from the current floating distance of the magnetic head is about 90 nm. In this case, to realize a half band width of 0.4 μm or more, it is necessary to secure the coercive force of 150 kA/m or more.

Viewing FIG. 9 from the above point, it is understood that the thickness of the metallic magnetic film for securing the coercive force of 150 kA/m or more is in the range of 8 to 50 nm.

By studying the above-indicated off-track characteristics and the overwrite characteristics as well as this coercive force, it is understood that the proper thickness of the metallic magnetic film is 8 to 50 nm.

The floating distance of the magnetic head tends to be smaller. It is presumed that the spacing between the magnetic head and the magnetic layer is 70 nm or lower in the near future. If the spacing is 70 nm or lower, it is preferable to keep the PW50 0.35 μm or lower. For this value, the coercive force is required to be 167 kA/m.

Viewing FIG. 9, for securing the coercive force of 167 kA/m or more, the thickness of the metallic magnetic film is required to be 15 to 35 nm. In a case that the spacing between the magnetic head and the magnetic layer is 70 nm or less, it is preferable that the thickness of the metallic magnetic film stays in this range.

EXPERIMENTS 1-15 TO 1-17

Those experiments are the same as the experiment 1-1 except that any one of a $Co_{80}Pt_{10}Cr_{10}$ alloy film, a $Co_{75}Pt_{12}Cr_{13}$ alloy film and a $Co_{62}Pt_{20}Cr_{18}$ alloy film is formed as the metallic magnetic film to have a thickness of 25 nm.

As for the magnetic disk produced as described above, the coercive force Hc was measured by the Kerr effect measuring apparatus. The relation between the Pt content of the metallic magnetic film and the coercive force Hc is shown in FIG. 10.

Figure 10:
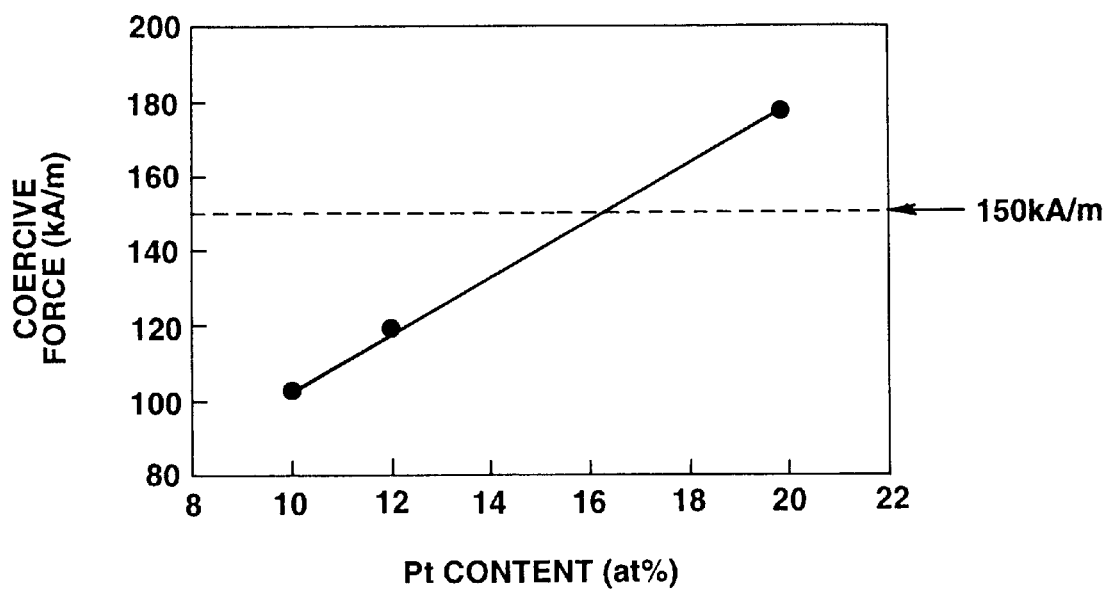
FIG. 10 is a characteristic view showing a relation between a Pt content and a coercive force Hc of a Co—Pt—Cr system alloy film.

As shown in FIG. 10, the coercive force Hc is increases in proportion to the Pt content of the metallic magnetic film.

As described above, from the view points of a half band width PW50 of the isolated reproduction waveform of the reproduction signal and the spacing between the magnetic head and the metallic magnetic film, the coercive force Hc is required to be 150 kA/m or more.

As is obvious from FIG. 10, for securing the coercive force Hc of 150 kA/m or more, the Pt content is 16 atomic % or more of the metallic magnetic film. That is, it is preferable that the metallic magnetic film of a Co—Pt system contains Pt of 16 atomic % or more.

EXPERIMENTS 2-1 TO 2-5

Those experiments are the same as the experiment 1-1 except that the thickness of the Cr primary coat is changed as listed in Table 2 and a $Co_{64}Pt_{20}Cr_{16}$ alloy film is formed as the metallic magnetic film to have a thickness of 40 nm.

As for the magnetic disks produced as described above, the saturated magnetism thickness Mr·δ (Mr: residual magnetism, δ: thickness of metallic magnetic film), the coercive force Hc, and the coercive force square ratio S* were measured by the vibrating specimen magnetometer (VSM). The measured values were Mr·δ=13 mA, Hc=150 kA/m, and S*=0.82.

As for the magnetic disk, as described above, the data was recorded and reproduced for estimating the overwrite characteristics and the off-track characteristics.

The measured result of the overwrite characteristics as well as the thickness of the Cr primary coat are listed in Table 2. The measured result of the off-track characteristics is listed in FIG. 11.

TABLE 2

|  | Thickness of Cr Primary Coat (nm) | Overwrite Characteristics (dB) |
| --- | --- | --- |
| Experiment 2-1 | 50 | 28.3 |
| Experiment 2-2 | 75 | 27.6 |
| Experiment 2-3 | 100 | 26.5 |
| Experiment 2-4 | 110 | 25.4 |
| Experiment 2-5 | 130 | 23.0 |

As listed in Table 2, the magnetic disks produced by the experiments 2-1 to 2-4, each primary coat of which has a thickness of 110 nm or less, produce an output of 25 dB or more, which is a practical overwrite characteristics. On the other hand, the magnetic disk produced by the experiment 2-5, the primary coat of which has a thickness of 130 nm, produces an output of 25 dB or loess, which does not lead to a necessary overwrite characteristics.

Figure 11:
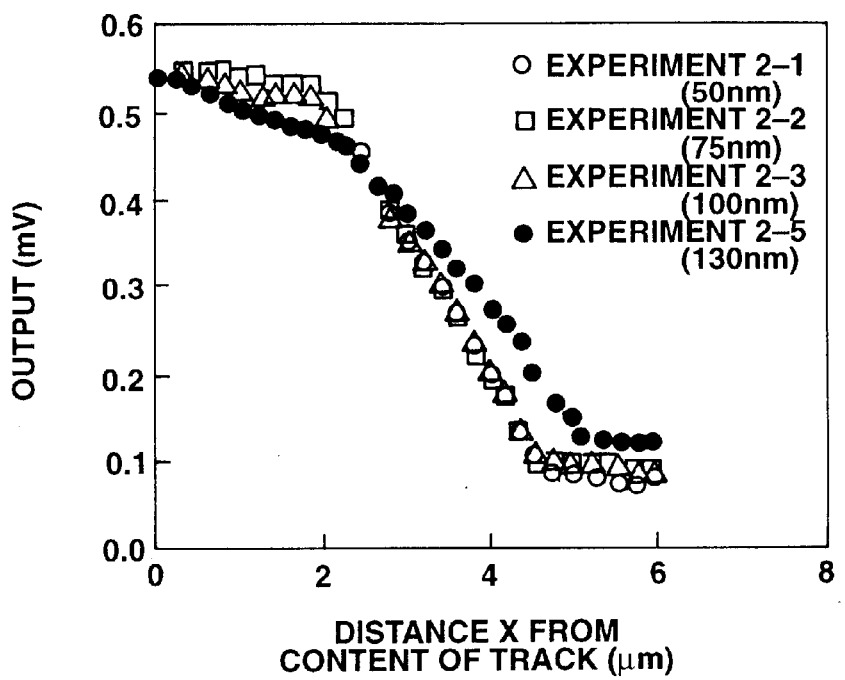
FIG. 11 is a characteristic view showing an off-track characteristic provided by the magnetic disk having a monolayered primary coat.

As is obvious from FIG. 11, when the magnetic head is slipped off the magnetic head, the magnetic disk produced by the experiment 2-5 leaves a large amount of signal, which results in effusing the signal too much.

From the foregoing description, as for the PERM disk, for improving the overwrite characteristics and the off-track characteristics, it is understood that the primary coat is required to have a thickness of 110 nm or less.

EXPERIMENTS 3-1 TO 3-4

This is the same as the experiment 2-1 except that the primary coat is a dual-layered one in which a second primary coat composed of Cr is formed on the first primary coat composed of carbon and the film composition is changed as shown in Table 3.

As for those magnetic disks produced by the experiments 3-1 to 3-4, the data is recorded and reproduced as mentioned above, for estimating the overwrite characteristics and the off-track characteristics.

Figure 12:
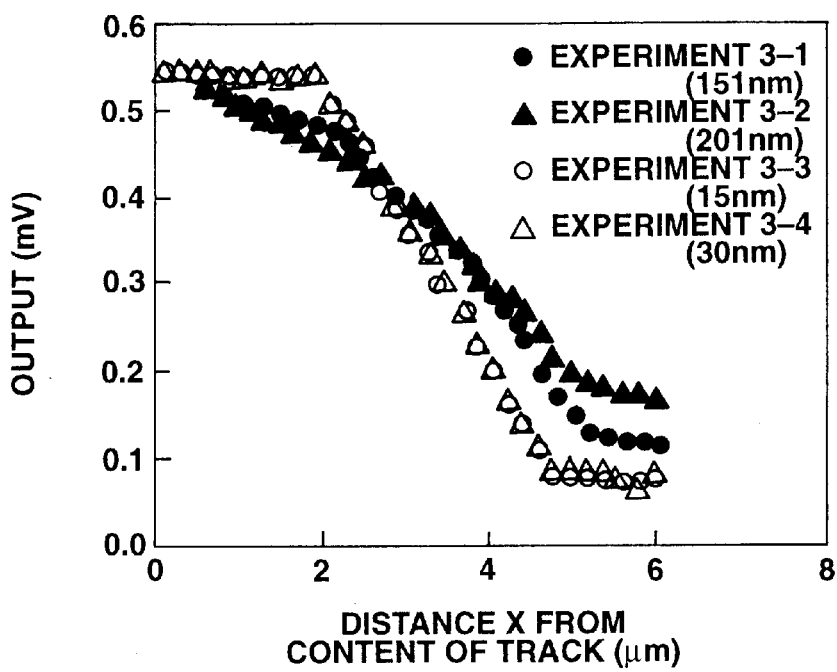
FIG. 12 is a characteristic view showing an off-track characteristic provided by the magnetic disk having a dual-layered primary coat.

The measured results of the overwrite characteristics with the thicknesses of the Cr primary coat are listed in Table 3. The table 3 also lists the result of the experiment 2-3 as indicated above. The measured results of the off-track characteristics are shown in FIG. 12.

TABLE 3

|  | Thickness of Cr Primary Coat (nm) | Thickness of C Primary Coat (nm) | Overwrite Characteristics |
| --- | --- | --- | --- |
| Experiment 3-1 | 150 | 1 | 22.5 |
| Experiment 3-2 | 200 | 1 | 21.5 |
| Experiment 3-3 | 10 | 5 | 30.8 |
| Experiment 3-4 | 20 | 10 | 30.6 |
| Experiment 2-3 | 100 | 0 | 26.5 |

As listed in Table 3, as for the magnetic disks produced by the experiments 3-3, 3-4 and 2-3, the thickness of the combination of the first and the second primary coats is 110 nm or less. Those magnetic disks produces an output of 25 dB or more, so that those disks can offer a practical overwrite characteristics. On the other hand, as for the magnetic disks produced by the experiments 3-1 and 3-2, the thickness of the primary coat is thicker than 110 nm. Those megnetic disks produce a less output than 25 dB, so that those disks cannot offer a necessary overwrite characteristics.

As is obvious from FIG. 12, the magnetic disks produced by these experiments 3-1 and 3-2 leave a large amount of signal if the magnetic head is slipped off the track, and thus the effusion of the signal is made large.

As is understood from the above description, even the dual-layered primary coat is required to suppress a total thickness of the primary coat as 110 nm or less.

EXPERIMENTS 3-5 TO 3-20

On a polyolefine plate with a thickness of 1.2 mm on which convexo-concave patterns are formed like the experiment 1-1, a first primary coat made of carbon and a second primary coat made of Cr are formed in room temperature and by the sputtering method. The conditions for forming the first and the second primary coats are indicated below. The thickness of the first primary coat is changed as indicated in Tables 4 and 5. The thickness of the primary coat is set as 100 nm (for the experiments 3-5 to 3-12) or 30 nm (for the experiments 3-13 to 3-20).

The condition for forming the first primary coat

Target: Carbon target of 6 inches in diameter

Electric Power: DC 450 W

Film-forming Speed: 0.47 nm/sec

The condition for forming the second primary coat

Target: Cr target of 6 inches in diameter
Electric Power: DC 300 W
Film-forming Speed: 2 nm/sec Next, a metallic magnetic film of $Co_{70}Pt_{12}Cr_{18}$ is formed on the second primary coat by the sputtering method. The metallic magnetic film has a thickness of 24 nm. The condition for forming the film will be indicated as below.

The condition for forming a metallic magnetic film
Target: $Co_{70}Pt_{12}Cr_{18}$ alloy target of 6 inches in diameter
Electric Power: DC 350 W
Film-forming Speed: 2 nm/sec As for the magnetic disks produced in the foregoing conditions, the coercive forces were measured. The results with the thickness of each first primary coat are listed in Tables 4 and 5.

TABLE 4

Second Primary Coat (Cr) = 100 nm

|  | Thickness of First Primary Coat (nm) | Coercive Force of Metallic Magnetic Film (Oe) |
|---|---|---|
| Experiment 3-5 | 0 | 1750 |
| Experiment 3-6 | 2 | 1760 |
| Experiment 3-7 | 3 | 1850 |
| Experiment 3-8 | 5 | 2000 |
| Experiment 3-9 | 10 | 2100 |
| Experiment 3-10 | 20 | 2130 |
| Experiment 3-11 | 30 | 2150 |
| Experiment 3-12 | 40 (Coat Stripped) | 2150 |

TABLE 5

Second Primary Coat (Cr) = 30 nm

|  | Thickness of First Primary Coat (nm) | Coercive Force of Metallic Magnetic Film (Oe) |
|---|---|---|
| Experiment 3-13 | 0 | 1250 |
| Experiment 3-14 | 2 | 1450 |
| Experiment 3-15 | 3 | 1900 |
| Experiment 3-16 | 5 | 2150 |
| Experiment 3-17 | 10 | 2200 |
| Experiment 3-18 | 40 | 2250 |
| Experiment 3-19 | 80 | 2400 |
| Experiment 3-20 | 90 (Coat Stripped) | 2450 |

As listed in Tables 4 and 5, the magnetic disks produced by the experiments 3-6 to 3-12 and 3-14 to 3-20 each provide the first primary coat. The magnetic disks produced by the experiments 3-5 and 3-13 each provide no first primary coat. The former disks yields a higher coercive force than the latter ones.

This result has revealed that the combination of the metallic magnetic film, the second primary coat of Cr, and the first primary coat of carbon, ranged from up to down, is effective in increasing the coercive force of the metallic magnetic film as making the thickness of the primary coat thinner.

However, if the first primary coat is thinner than 2 nm, it is not effective in sufficiently improving the coercive force.

As listed in Table 5, in a case that the first primary coat is thicker than 80 nm, if the second primary coat is as thin as 30 nm, the coats may be stripped.

Hence, the most approximate thickness of the first primary coat is in the range of 2 to 80 nm from the view points of the coercive force Hc and the coat stripping.

EXPERIMENTS 3-21 TO 3-26

Those experiments are the same as the experiments 3-5 to 3-20 except the use of the glass plate with a thickness of 0.899 mm. Those experiments were executed to produce the magnetic disks each of which has the corresponding first primary coat. In the experiments 3-21 to 3-28, the thickness of the second primary coat is fixed to 100 nm. In the experiments 3-29 to 3-36, the thickness of the second primary coat is fixed to 30 nm.

As for the produced magnetic disks, the coercive forces were measured. The results with the thicknesses of the first primary coats are listed in Tables 6 and 7.

TABLE 6

Second Primary Coat (Cr) = 100 nm

|  | Thickness of First Primary Coat (nm) | Coercive Force of Metallic Magnetic Film (Oe) |
|---|---|---|
| Experiment 3-21 | 0 | 1600 |
| Experiment 3-22 | 2 | 1610 |
| Experiment 3-23 | 3 | 1700 |
| Experiment 3-24 | 5 | 1900 |
| Experiment 3-25 | 10 | 2000 |
| Experiment 3-26 | 30 | 2050 |
| Experiment 3-27 | 40 | 2100 |
| Experiment 3-28 | 60 (Coat Stripped) | 2100 |

TABLE 7

Second Primary Coat (Cr) = 30 nm

|  | Thickness of First Primary Coat (nm) | Coercive Force of Metallic Magnetic Film (Oe) |
|---|---|---|
| Experiment 3-29 | 0 | 1200 |
| Experiment 3-30 | 2 | 1400 |
| Experiment 3-31 | 3 | 1800 |
| Experiment 3-32 | 5 | 2000 |
| Experiment 3-33 | 10 | 2100 |
| Experiment 3-34 | 40 | 2150 |
| Experiment 3-35 | 80 | 2300 |
| Experiment 3-36 | 90 (Coat Stripped) | 2300 |

As listed in Tables 6 and 7, the magnetic disks produced by the experiments 3-22 to 3-28 and 3-30 to 3-36 each provide the first primary coat. On the other hand, the magnetic disks produced by the experiments 3-21 and 3-29 each provide no first primary coat. The former disks yield a higher coercive force than the latter disks.

In a case that the glass plate is used, like the plastic plate, the combination of the metallic magnetic film, the second primary coat of Cr, and the first primary coat of carbon, ranged from up to down, is effective in increasing the coercive force of the metallic magnetic film with making the primary coat thinner.

However, if the first primary coat is thinner than 2 nm, the primary coat is not effective in sufficiently improving the coercive force.

As listed in Table 7, in a case that the first primary coat is thicker than 80 nm, if the second primary coat is as thin as 30 nm, the coat may be stripped. This has revealed that in case of using the glass plate, the most approximate thickness of the first primary coat is in the range of 2 to 80 nm.

EXPERIMENTS 3-37 AND 3-38

Those experiments as the same as the experiment 3-8 except the provision of an Si film with a thickness of 5 nm and a Ge film with a thickness of 5 nm.

As for the magnetic disks produced by these experiments, the coercive forces were measured. The results with the materials of the first primary coats are listed in Table 8.

TABLE 8

|  | Material of First Primary Coat | Coercive Force of Metallic Magnetic Film |
|---|---|---|
| Experiment 3-37 | Si | 1950 |
| Experiment 3-37 | Ge | 1900 |

As listed in Table 8, the magnetic disk produced by the experiment 3-37, which provides the first primary coat composed of Si, and the magnetic disk produced by the experiment 3-38, which provides the first primary coat composed of Ge, obtain a higher coercive force than the magnetic disk produced by the experiment 3-5.

This has revealed that the first primary coat of Si or Ge is effective in increasing the coercive force of the metallic magnetic film like the first primary coat of C.

The present invention has been described in an illustrative manner. In this regard, it is evident that those skilled in the art once given the benefit of the foregoing disclosure, may now make modifications to the specific embodiments described herein without departing from the spirit of the present invention. Such modifications are to be considered within the scope of the present invention which is limited solely by the scope and spirit of the appended claims.

What is claimed is:

1. A magnetic disk comprising:
    a non-magnetic plate having data tracks defined by defined concentric grooves in the plate which separate the data tracks and having at least a servo signal formed by convexo-concave patterns, the plate having a surface coarseness Ra of 2 nm or less and projection height of Rmax of 25 nm or less, a metallic magnetic film formed over said plate, said metallic magnetic film having a thickness of 50 nm or less.

2. A magnetic disk as claimed in claim 1, wherein said metallic magnetic film is composed of a Co—Pt system alloy or a Co—Pd system alloy.

3. A magnetic disk as claimed in claim 2, wherein said metallic magnetic film is composed of a Co—Pt—Cr system alloy or a Co—Pd—Cr system alloy.

4. A magnetic disk as claimed in claim 2, wherein said metallic magnetic film is composed of a Co—Pt system alloy or a Co—Pt—Cr system alloy containing Pt of 16 atomic % or more.

5. A magnetic disk as claimed in claim 4, wherein said non-magnetic plate is composed of a plastic material whose glass transition temperature is 120° C. or lower.

6. The magnetic disk of claim 1, wherein the grooves have a depth of about 200 nm, the data tracks have a width of about 3.2 $\mu$m and a pitch of about 4.8 $\mu$m.

7. A magnetic disk comprising:
    a non-magnetic plate having data tracks defined by defined concentric grooves in the plate which separate the data tracks on which at least a servo signal is formed by convexo-concave patterns, the plate having a surface coarseness Ra of 2 nm or less and a projection height of Rmax of 25 nm or less;
    a primary coat formed on said non-magnetic plate; and
    a metallic magnetic film formed on said primary coat, wherein,
        said primary coat has a thickness of 110 nm or lower;
        said metallic magnetic film has a thickness of 50 nm or less; and
        said primary coat increases the coercive force of said metallic magnetic film by enhancing in-plane orientation of the metallic magnetic film.

8. A magnetic disk as claimed in claim 7, wherein said primary coat is composed of a first primary coat of any one of C, Si and Ge and a second primary coat of a main component of Cr.

9. A magnetic disk as claimed in claim 8, wherein the thickness of said first primary coat ranges from 2 to 80 nm.

10. A magnetic disk as claimed in claim 8, wherein the thickness of said second primary coat ranges from 5 to 108 nm.

11. A magnetic disk as claimed in claim 7, wherein said non-magnetic plate is composed of a plastic material whose glass transition temperature is 120° C. or lower.

12. The magnetic disk of claim 7, wherein the grooves have a depth of about 200 nm, the data tracks have a width of about 3.2 $\mu$m and a pitch of about 4.8 $\mu$m.

* * * * *